United States Patent
Hahn et al.

(10) Patent No.: US 10,219,182 B1
(45) Date of Patent: Feb. 26, 2019

(54) CHANNEL BANDWIDTH SELECTION

(71) Applicant: Hewlett Packard Enterprise Development LP, Houston, TX (US)

(72) Inventors: Dongwoon Hahn, Santa Clara, CA (US); Mathieu Mercier, Laval (CA); Sachin Ganu, San Jose, CA (US); Nethra Muniyappa, Santa Clara, CA (US); Sree Harsha, Santa Clara, CA (US); Rajini Balay, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/700,161

(22) Filed: Sep. 10, 2017

(51) Int. Cl.
  *H04L 12/50* (2006.01)
  *H04W 28/20* (2009.01)
  *H04W 72/04* (2009.01)
  *H04W 72/08* (2009.01)
  *H04W 84/12* (2009.01)

(52) U.S. Cl.
  CPC ....... *H04W 28/20* (2013.01); *H04W 72/0453* (2013.01); *H04W 72/087* (2013.01); *H04W 84/12* (2013.01)

(58) Field of Classification Search
  CPC .. H04W 28/20; H04W 72/0453; H04W 84/12
  USPC ..... 370/379, 328, 338; 455/422.1, 423, 418, 455/464
  See application file for complete search history.

(56) References Cited

U.S. PATENT DOCUMENTS

| | | | |
|---|---|---|---|
| 6,085,094 A | 7/2000 | Vasudevan et al. | |
| 6,154,655 A | 11/2000 | Borst et al. | |
| 7,346,356 B2 | 3/2008 | Emami et al. | |
| 8,725,158 B2 | 5/2014 | Campos et al. | |
| 2010/0157910 A1* | 6/2010 | Nentwig | H04L 5/0007 370/329 |
| 2011/0003606 A1* | 1/2011 | Forenza | H04B 17/318 455/501 |

(Continued)

OTHER PUBLICATIONS

Chieochan, S. et al., Channel Assignment Schemes for Infrastructure-Based 802.11 WLANs: A Survey, (Research Paper), May 1, 2010, 13 Pages.

*Primary Examiner* — Nghi H Ly
(74) *Attorney, Agent, or Firm* — Brooks, Cameron & Huebsch, PLLC

(57) ABSTRACT

A method related to selecting a channel bandwidth may include partitioning the plurality of networks into a plurality (P) of local radio environments and identifying, for the P local radio environments, an available channel bandwidth set comprising a plurality of channel bandwidth values. The method may also relate to determining whether the plurality of channel bandwidth values provide a frequency reuse distance that is greater than a threshold frequency reuse distance, wherein the frequency reuse distance is estimated based at least on the pathloss measurement and, based on a determination that at least one of the plurality of channel bandwidth values provides the frequency reuse distance that is greater than the threshold frequency reuse distance, configuring a channel plan for the plurality of networks with a channel bandwidth value from the at least one of the plurality of channel bandwidth values.

20 Claims, 8 Drawing Sheets

(56) References Cited

U.S. PATENT DOCUMENTS

2011/0136496 A1    6/2011  Klang et al.
2016/0037550 A1*  2/2016  Barabell .............. H04B 17/318
                                                       455/450

* cited by examiner

CHANNEL BANDWIDTH SELECTION

BACKGROUND

Wireless networks can include hardware components that send and receive signals over various channels. A wireless network channel may be configured with a channel bandwidth.

DETAILED DESCRIPTION

Figure 1:
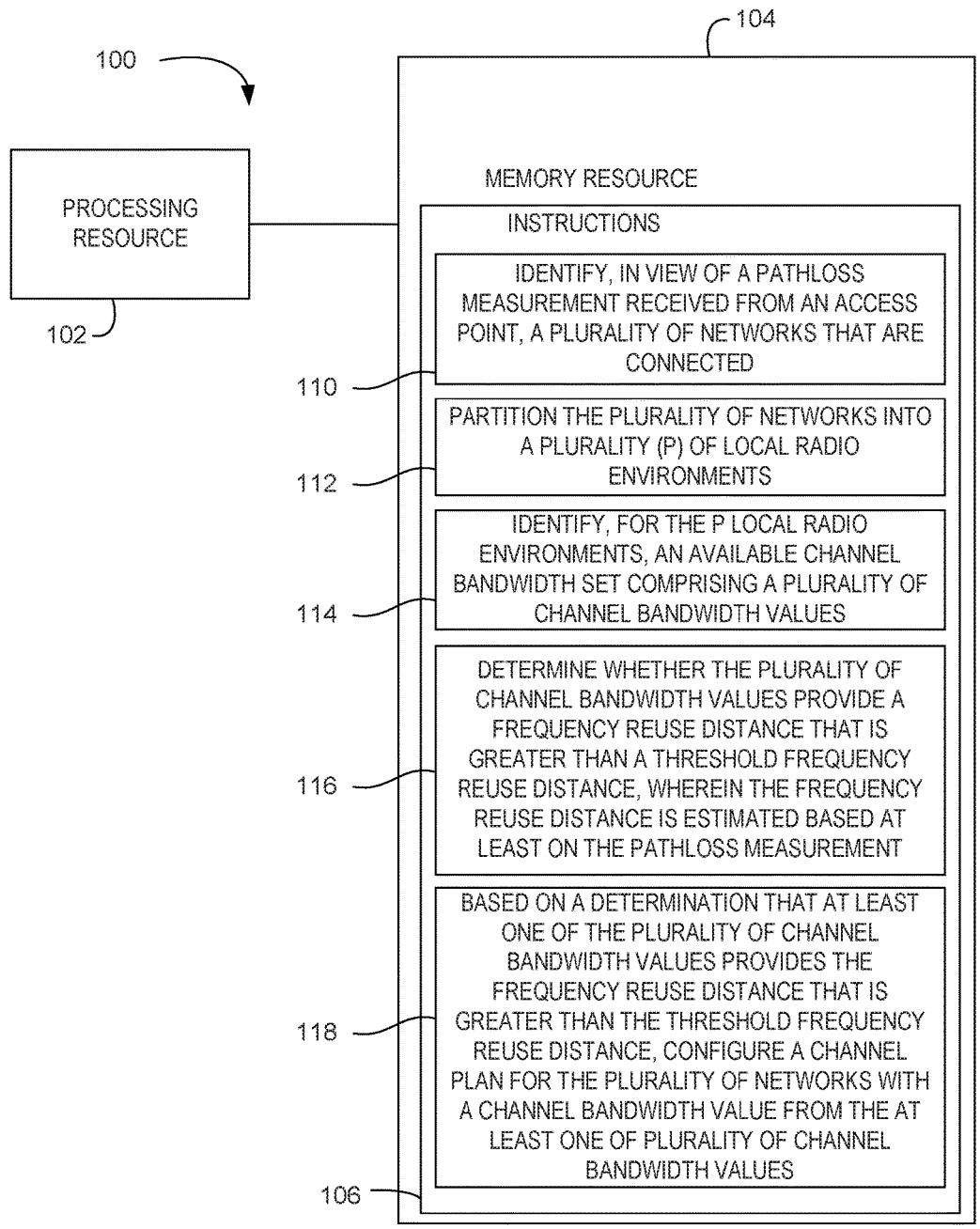
FIG. 1 illustrates an example of an apparatus consistent with the disclosure.

In a number of examples, a channel bandwidth can be configured for usage by a plurality of access points (APs). The channel bandwidth can also be configured for a wireless local area network (WLAN). For example, the channel bandwidth can be configured in a channel plan for a plurality of APs in the WLAN.

Currently, the channel bandwidth may be manually configured such that the channel bandwidth is not automatically selected. In some systems that support automatic channel bandwidth, a cost metric may be computed for each channel bandwidth and the channel bandwidth providing the minimum cost metric may be selected. However, in such an automatic channel bandwidth selection system, the cost metric cannot be normalized between different channel bandwidths. As such, the un-normalized cost metric can lead to the selection of a channel bandwidth that is not optimal for the corresponding system.

In a number of examples described herein, a frequency reuse distance can be used in selecting a channel bandwidth. As used herein, a frequency reuse distance may refer to the closest distance between the center of two APs operating on a wireless channel at the same frequency. A channel bandwidth may refer to the difference between an upper frequency and a lower frequency. In some examples, the upper frequency and the lower frequency are defined for each channel.

Using the frequency reuse distance to select a channel bandwidth can lead to some difficulties. For example, it may be difficult to utilize the frequency reuse distance in a wireless network, such as a wireless local area network (WLAN), because a channel (e.g., a frequency range) and a channel bandwidth may be assigned together. The frequency reuse distance maybe estimated/calculated for a channel bandwidth selection before the frequency range is assigned. As used herein, estimate and calculate are used interchangeably. As such, estimating a channel bandwidth can include calculating a channel bandwidth.

It may also be difficult to utilize the frequency reuse distance in a wireless network because valid channels and valid channel bandwidth values may be different for each AP depending on the capabilities of the AP, regulatory domains, as well as local radio frequency (RF) conditions. Furthermore, the channels and the channel bandwidth values of an AP may vary over time.

Although most APs are stationary, a radio environment may change and/or the placement of APs can change after installation of the APs. Furthermore, APs can be mobile. Thus, the radio density and the pathloss measurements between APs may also be dynamic.

Interference between in-band transmissions may exist rendering portions of a bandwidth unusable for periods of time. In-band transmissions can include overlapping WLAN networks, non-WLAN industrial, scientific, and medical radio (ISM) band devices, and/or radar pulses, among other in-band transmissions.

With the introduction of basic service set (BSS) coloring by the IEEE 802.11 ax standard, channel bandwidth selections may be performed in view of the BSS colors. In some examples, the BSS color of each radio dynamically changes. As used herein, BSS colors may refer to a new field in the preambles of WLAN frames. The BSS color field can identify the BSS in which a corresponding WLAN frame is transmitted. Client devices within hearing distance of the frame preamble may read the BSS color during the carrier sense process, and thus identify the BSS of the frame transmission as well as determine the received signal strength. If the BSS color indicates that the detected transmission is in a client device's own BSS, then the client device can defer its transmission. However, if the BSS color indicates that the detected transmission is in a different BSS, then the client device need not defer its transmission, as long as the received signal strength of the detected preamble is below a threshold.

A number of examples provide a channel bandwidth selection for each AP (e.g., radio) based on a network-wide channel bandwidth selection. To assign the channel bandwidth (e.g., channel bandwidth selection), a frequency reuse distance is estimated based on the history of pathloss measurements with neighboring APs (or neighboring radios). The frequency reuse distance may be calculated/estimated without assigning a channel (e.g., frequency range) for each AP. A system-wide frequency reuse distance may be calculated based on the estimated frequency reuse distance from each radio. A channel bandwidth may be selected based on the system-wide frequency reuse distance. The channel bandwidth selection may be adaptive to a dynamically changing radio density, a heterogeneous radio environment, different hardware capabilities, different configurations, and different certifications for each AP. A heterogeneous radio environment includes a high noise radar, for example.

Heterogeneity in APs can result in different sets of channels and different sets of channel bandwidths that are usable by each AP. A number of examples provide a channel bandwidth selection for handling the heterogeneity between APs. A number of examples also provide the channel bandwidth selection when the AP is configured with BSS colors. In such a case, a frequency/BSS color reuse distance may be estimated and a channel bandwidth may be selected based on this estimation.

A number of benefits of the examples described herein include automatically selecting a channel bandwidth while the placement of APs is changing, a radio environment is dynamically changing, and/or the configuration of each AP is changing. A channel bandwidth selection may be automatically adaptive to a change in radio density, an installation of new APs, and/or a removal of existing APs.

In cellular networks, the licensed spectrum may be used and the placement of base stations may be static such that the channel frequency range and bandwidth can be planned and can be statically configured. In wireless networks such a WLAN, radios operate in an unlicensed spectrum such as an ISM band. The ISM band may be shared with unknown interfering APs (e.g., radios) and devices. The location of the APs cannot be fully controlled. In some examples, the APs may actually be mobile.

The number of available channels may be different for each channel bandwidth. For WLAN applications, the channel bandwidths may include 20 megahertz (MHz), 40 MHz, 80 MHz, and/or 160 MHz. The number of available channels may be different for each channel bandwidth. The number of channels available in the smaller channel bandwidths may be greater than the number of channels available in the larger channel bandwidths. In some examples, the number of channels available in the larger channel bandwidths may be greater than the number of channels available in the smaller channel bandwidths.

The number of channels available for a specific bandwidth can be different for each AP based on AP hardware capabilities, AP configurations, certification, and dynamic conditions. For examples, some APs do not support 80 MHz while other APs do not support 160 MHz. AP configurations may result in different channel list configurations for each channel bandwidth for different APs. The certification channel list can be different for each country domain. Dynamic conditions may lead to radar events and high noise events which render some channels unavailable. The number of non co-channel neighbors are computed given the available channel list for each radio. This channel list is dynamically updated based on the radar events and the high nose events, among other types of events. For instance, a channel can be blacklisted for a certain AP and each AP can have different number of feasible channels to use. As such, a number of examples are adaptive to dynamic radio events in channel bandwidth selection.

Channels may also be unavailable to meet regulatory requirements or for internal decision. Regulatory requirements can include black out interval after radar detection. Internal decisions include internally excluding channels with known problems. These conditions may change dynamically over time. As a result, each AP may have a different number of available channels per channel bandwidth which may change over time.

In assigning the channels, at least a certain frequency reuse distance (e.g., minimum frequency reuse distance) may be used to avoid interference in accessing a same frequency resource by different APs. The frequency reuse distance becomes smaller as the radio density increases. It becomes harder to utilize frequency reuse distances between radios on the same frequency range as the frequency reuse distance becomes smaller. The radio density can change dynamically in response to the installation and/or removal of APs, the utilization of mobile APs, and various other causes affecting the radio density such as the absence/presence of crowds and/or structural changes, among other causes affecting the radio density.

Figure 4:
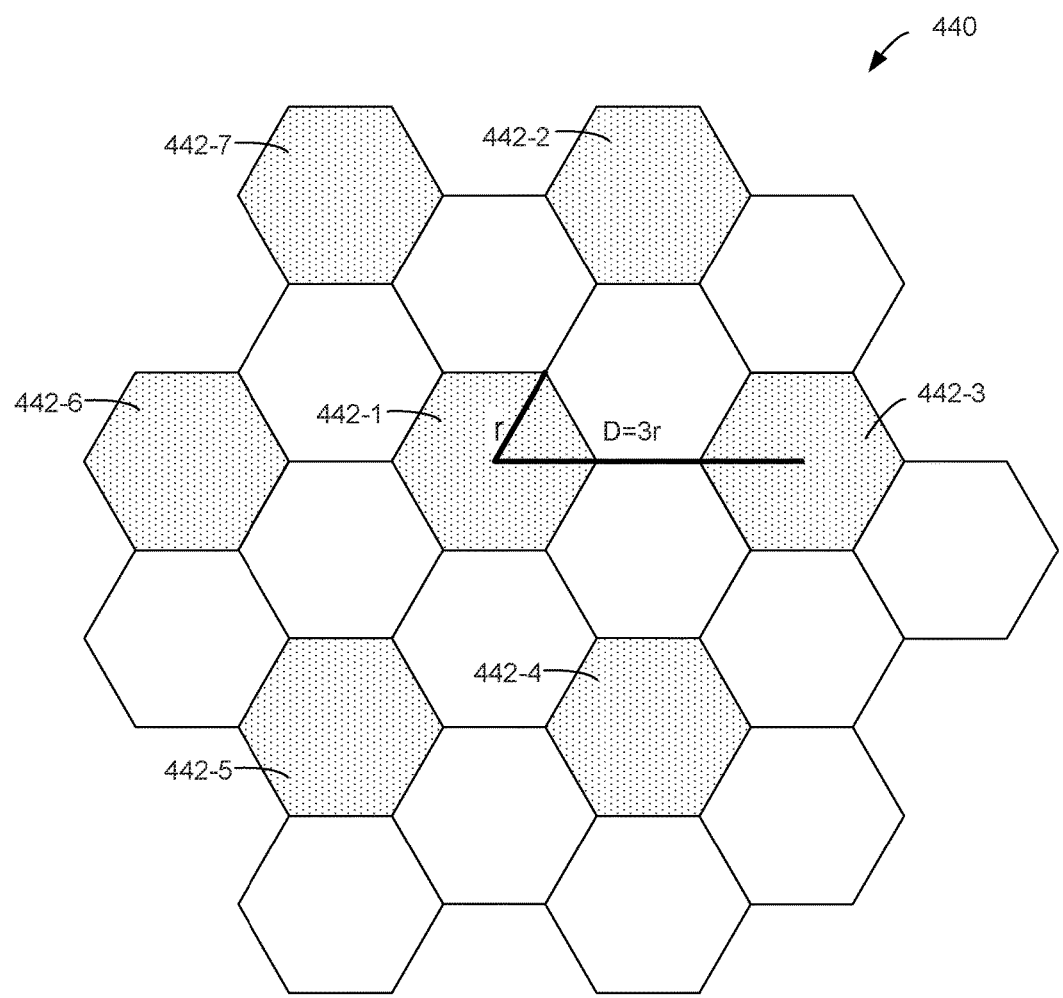
FIG. 4 illustrates an example of a frequency reuse distance consistent with the disclosure.
Figure 5:
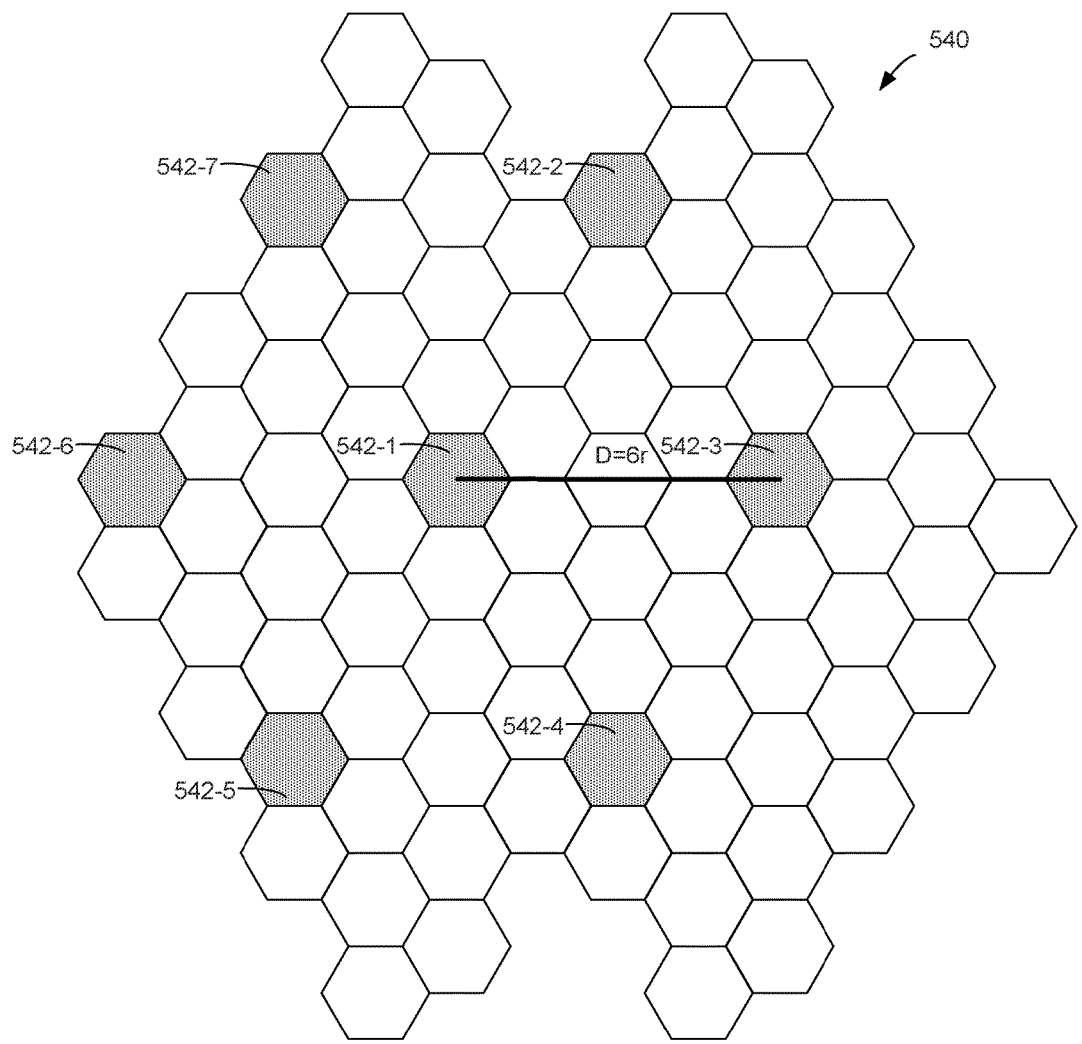
FIG. 5 illustrates an example of a frequency reuse distance consistent with the disclosure.

In the hexagon cell model, the frequency reuse distance $D=\sqrt{3C}\times r$ where C is a number of channels and r is the radius (e.g., coverage radius or an area in which an AP broadcasts) of a cell. For example, D=3r when C is equal to three (e.g., the typical number of channels used in the 2.4 gigahertz (GHz) band in WLAN). FIG. 4 provides an example of the frequency reuse distance when C is equal to three. D=6r when C is equal to twelve (e.g., the typical number of channels used in the 5 GHz band when a channel bandwidth is 40 MHz). FIG. 5 provides an example of the frequency reuse distance when C is equal to twelve.

In a number of examples, d is the distance between the neighbor radio and a radio and/or d can also be the distance between a neighbor AP and an AP and d' is the number of layers in hex models which is at a distance less than the frequency reuse distance. For example, if D=3r (e.g., 3 channels), then d'=1. If D=6r (e.g., 12 channels), then d'=3. Also, N is a bound of the number of non-co channel neighbors which are located at a distance less than the estimated frequency reuse distance. Accordingly, d' and N are given as follows:

$$d' \triangleq \left\lceil \frac{D-r}{2r} \right\rceil$$

$$N \geq \sum_{i=1}^{d'} 6 \cdot i = 6 \frac{d'(d'+1)}{2}.$$

Figure 6:
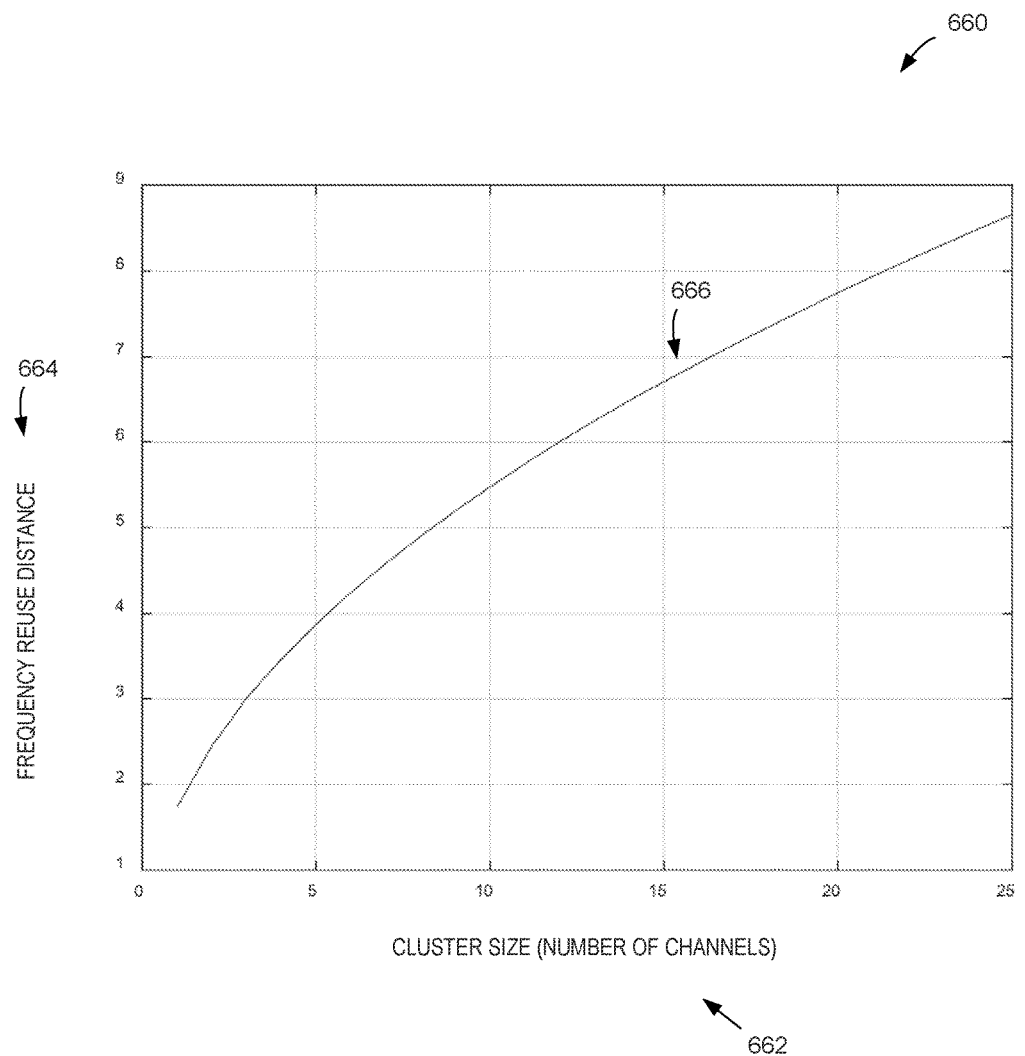
FIG. 6 illustrates a graph of a frequency reuse distance consistent with the disclosure.
Figure 7:
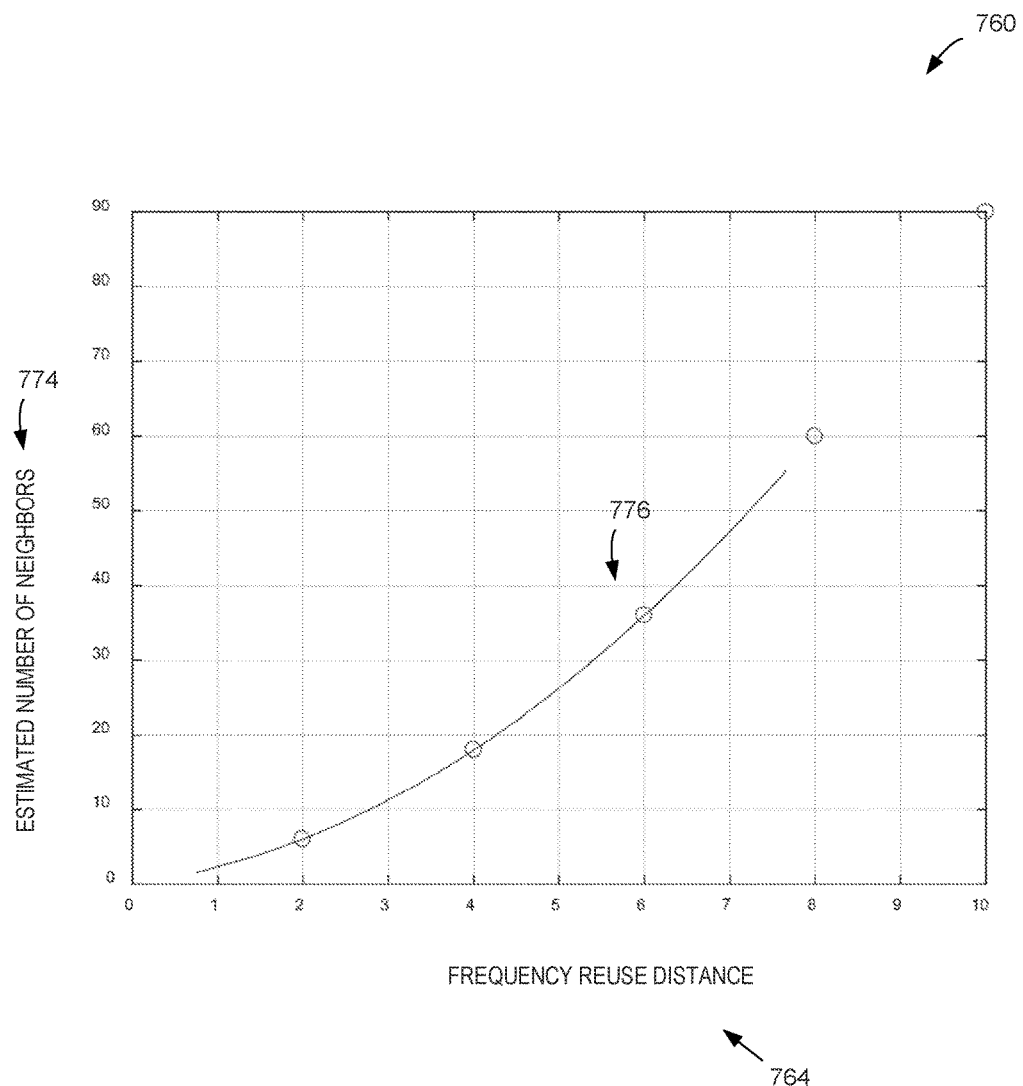
FIG. 7 illustrates a graph of a frequency reuse distance consistent with the disclosure.
Figure 8:
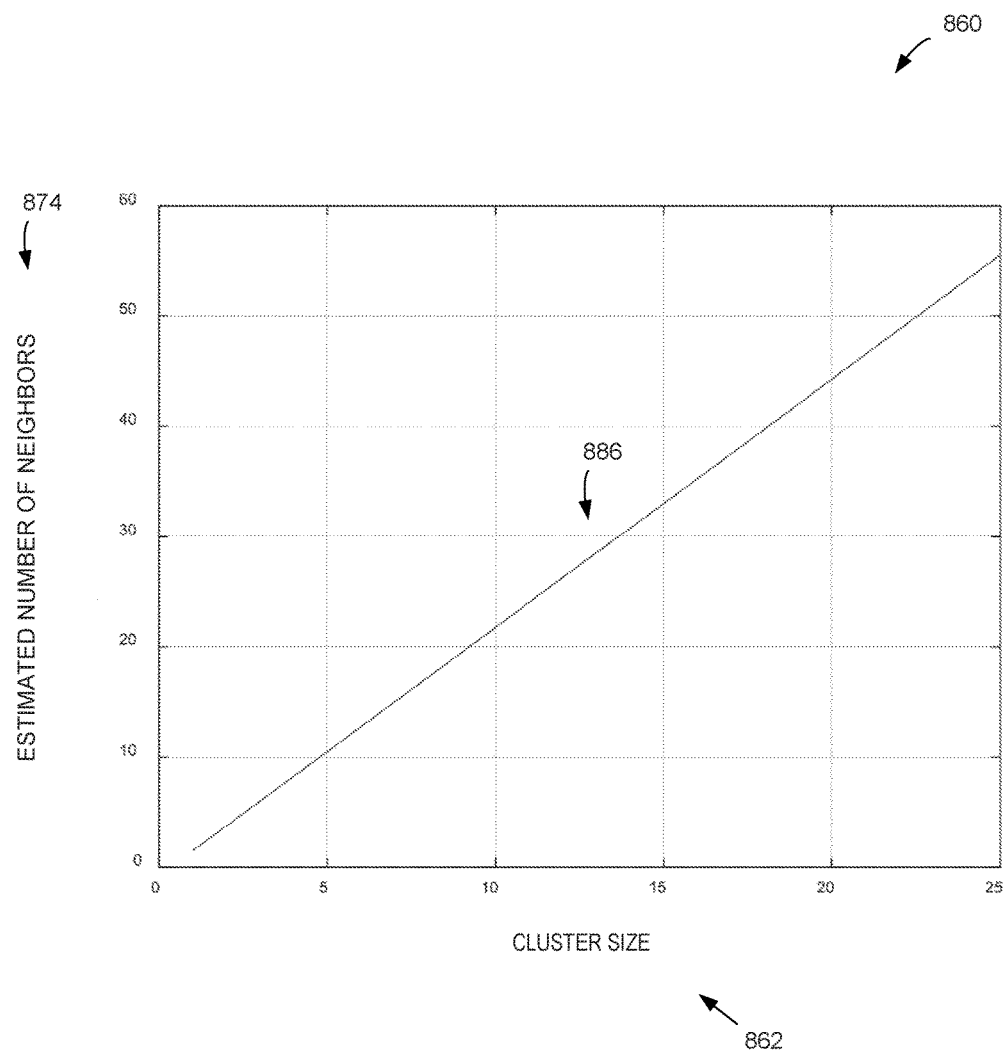
FIG. 8 illustrates a graph of a number of channels consistent with the disclosure.

FIGS. 6, 7, and 8 show the relation between a frequency reuse distance, a number of channels, and a bound on the number non co-channel neighbors within the frequency reuse distance.

The channel bandwidth may be assigned, selected, and/or calculated as described below. Each AP (e.g, a radio) can provide a plurality of pathloss measurements corresponding to neighbor radios and a number of channels for each channel bandwidth supported by the AP. A pathloss measurement history can be compiled and stored in memory from the plurality of pathloss measurements received a period of time. At a time of the channel bandwidth computation, the pathloss measurement history may be processed and one representative pathloss value may be computed for each neighbor radio from each radio. The representative value can be selected using any statistical models including a mean, a median, and/or a mode, among other possible statistical models. Utilizing the one representative pathloss value to select the channel bandwidth can allow for a dynamic representation of the updated pathloss and radio density as the network changes over time.

For a given pathloss measurement (e.g., the one representative pathloss value), a plurality of connected networks can be identified. For each connected network, the network may be partitioned such that each partition (P) represents a local radio environment. That is, each connected network can be partitioned into a plurality (P) of local radio environments.

For each AP in each of the P partitions, the available channel bandwidth set (CBWap) may be identified. The CBWap describes the channel bandwidths available to an AP. A plurality of CBWaps corresponding to a plurality of AP in a partition are used to define an available channel bandwidth set (CBWp) for the partition. Each of the CBWaps and the CBWps are comprised of a plurality of channel bandwidth values (CBWs).

For each CBW in the available channel bandwidth set CBWp, determine if the CBW can provide a sufficient frequency reuse distance. The feasibility of the CBWp can be determined as follows:

For each AP in a partition, in a network, and/or in a plurality of networks, calculate the frequency reuse distance when a CBW is used. Given a CBW, $C_{CBW}$ is a number of channels available in the CBW.

The frequency reuse distance may be calculated and/or estimated utilizing a CBW based on the pathloss measurement. For examples, the neighboring APs of an AP are ranked (nbr) based on corresponding pathloss values. The $nbr_1$ is the closest neighbor of the AP. That is, the $nbr_1$ identifies a neighbor AP with a smallest pathloss value to the AP. The $nbr_k$ is the neighboring AP with the kth pathloss value in the ranking. The bound $N_{CBW}$ can be calculated. $N_{CBW}$ is a number of non co-channel neighbors in distance less than a frequency reuse distance D. FIG. 8 provides a graph of the frequency reuse distance. Estimating the frequency reuse distance further comprises estimating a co-channel frequency reuse distance. The co-channel frequency reuse distance is the frequency reuse distance corresponding to the pathloss value of the AP with the rank equal to $nbr_{NCBW+1}$. The pathloss value of the AP with the rank equal to $nbr_{NCBW+1}$ may be stored as $PL_r$.

Calculating a channel bandwidth also includes calculating a frequency reuse distance $\tilde{D}$ for a partition when CBW is used. $\tilde{D}$ is the distance corresponding to the median value of pathloss measurements of neighboring APs ($PL_r$). Statistics other than a median can be also used. The CBW may be feasible if $\tilde{D}$ is greater than a threshold frequency reuse distance ($D_t$) used to separate the co-channel neighbors.

If $\tilde{D}$ is less than or equal to the $D_t$ used to separate the co-channel neighbors, then a widest channel bandwidth may be selected from the feasible channel bandwidths. If no channel bandwidth is feasible, the channel bandwidth with the greatest estimated frequency reuse distance may be selected.

In a number of examples, if further information such as a noise floor and/or a clear channel assessment (CCA) threshold is available from a number of APs, the signal-to-noise ratio (SNR) and a received signal strength indicator (RSSI) are computed utilizing the pathloss measurement and the noise floor at a receiving end of each AP. An adjusted pathloss value, that is set to max when the RSSI is less than the CCA threshold and adjusted by the difference between the actual CCA threshold, may be used in ranking neighbor radios. As sued herein, CCA describes is one of two carrier sense mechanisms in WLAN. The CCA is part of the physical medium dependent (PMD) and the physical layer convergence protocol (PLCP) layer.

A channel bandwidth can be assigned utilizing BSS coloring. Assigning the channel bandwidth utilizing BSS coloring can include utilizing a number of channels for each BSS color ($C_{CBW}'$) instead of $C_{CBW}$. For example, when 63 BSS colors are available, $C_{CBW}'=C_{CBW}*\{$The number of BSS colors available per partition$\}=C_{CBW}*63$. In this way, instead of utilizing a frequency reuse distance, a frequency/BSS color reuse distance can be estimated and/or calculated and used in a channel bandwidth selection. A minimum reuse distance between the APs using the same frequency/BSS color parameter set may be defined to be $D_{tb}$. $D_{tb}$ can differ from $D_t$ (e.g., threshold frequency reuse distance). The adjusted pathloss measurements can be determined from the CCA threshold which may be different between inter/intra BSSs.

Neighbor radios are ranked based on the pathloss value as previously described. The radios can be on the same color in a first example and/or they may be on a different color in a second example. As used herein, the use of a first and a second with regards examples do provide an order or a preference of the examples but differentiate the examples. In the first example, a smaller threshold value is sued in assessing channel clearance. Suppose that the difference in threshold values between a first example and a second example is 5 decibel (dB). The pathloss for the neighbor on a different color can be kept while the pathloss for the neighbor on the different color can be adjusted by 5 dB and the rest of the computation would remain the same. If two radios are at a same pathloss of 70 dB, then for a radio with a same color, the pathloss value is remains at 70 dB and for a radio with a different color, the pathloss value is adjusted to 75 dB.

The figures herein follow a numbering convention in which the first digit corresponds to the drawing figure number and the remaining digits identify an element or component in the drawing. For example, reference numeral 104 may refer to element "04" in FIG. 1 and an analogous element may be identified by reference numeral 204 in FIG. 2. Elements shown in the various figures herein can be added, exchanged, and/or eliminated so as to provide a number of additional examples of the disclosure. In addition, the proportion and the relative scale of the elements provided in the figures are intended to illustrate the examples of the disclosure, and should not be taken in a limiting sense.

FIG. 1 illustrates an example of an apparatus 100 consistent with the disclosure. As shown in FIG. 1, the apparatus 100 includes a processing resource 102 and a memory resource 104. In some examples, the apparatus 100 may be a network controller, an AP, and/or a client. For example, the processing resource 102 and/or the memory resource 104 may comprise the network controller, or the processing resource 102 and the memory resource 104 may be part of the network controller.

The processing resource 102 may be a hardware processing unit such as a microprocessor, application specific instruction set processor, coprocessor, network processor, or similar hardware circuitry that can cause machine-readable instructions to be executed. The memory resource 104 may be any type of volatile or non-volatile memory or storage, such as random access memory (RAM), flash memory, read-only memory (ROM), storage volumes, a hard disk, or a combination thereof.

The memory resource 104 may store instructions 106 thereon. When executed by the processing resource 102, the instructions 106 may cause the apparatus 100 to perform specific tasks and/or functions. For example, at block 110, the memory resource 104 may store instructions 106 which may be executed by the processing resource 102 to cause the apparatus 100 to identify, in view of a pathloss measurement received from an AP, a plurality of networks that are connected.

At block 112, the memory resource 104 may store instructions 106 which may be executed by the processing resource 102 to cause the apparatus 100 to partition the plurality of networks into a plurality (P) of local radio environments. At block 114, the memory resource 104 may store instructions 106 which may be executed by the processing resource 102 to cause the apparatus 100 to identify, for the P local radio environments, an available channel bandwidth set comprising a plurality of channel bandwidth values.

At block 116, the memory resource 104 may store instructions 106 which may be executed by the processing resource 102 to cause the apparatus 100 to determine whether the plurality of channel bandwidth values provide a frequency reuse distance that is greater than a threshold frequency reuse distance, wherein the frequency reuse distance may be estimated based at least on the pathloss measurement. At block 118, the memory resource 104 may store instructions 106 which may be executed by the processing resource 102 to cause the apparatus 100 to, based on a determination that at least one of the plurality of channel bandwidth values provides a frequency reuse distance that is greater than the threshold frequency reuse distance, configure a channel plan for the plurality of networks with a channel bandwidth value from the at least one of the plurality of channel bandwidth values. The memory resource 104 may also store instructions 106 which may be executed by the processing resources 102 to cause the apparatus 100 to select the channel bandwidth value that is a widest channel bandwidth value from the at least one of the plurality of channel bandwidth values.

The memory resource 104 may store instructions 106 which may be executed by the processing resource 102 to cause the apparatus 100 to, based on a determination that the plurality of channel bandwidth values are less than or equal to the threshold frequency reuse distance, configure the channel plan for the plurality of networks with a channel bandwidth from the plurality of channel bandwidth values with a greatest frequency reuse distance.

The memory resource 104 may also store instructions 106 which may be executed by the processing resource 102 to cause the apparatus 100 to configure the channel plan based on a change in a placement of an AP of at least one of the plurality of networks. The memory resource 104 may also store instructions 106 which may be executed by the processing resource 102 to cause the apparatus 100 to configure the channel plan based on a change of a radio environment in which at least one of the plurality of networks is operating. The memory resource 104 may also store instructions 106 which may be executed by the processing resource 102 to cause the apparatus 100 to configure the channel plan based on a change to a configuration of an AP of at least one of the plurality of networks. In some examples, the channel plan comprises a frequency rage, a primary channel, and/or the channel bandwidth. The instructions 106 which may be executed by the processing resource 102 to cause the apparatus 100 to identify the available channel bandwidth set may further be configured to identify a union of a plurality of channel bandwidth sets corresponding to the P local radio environments.

Figure 2:
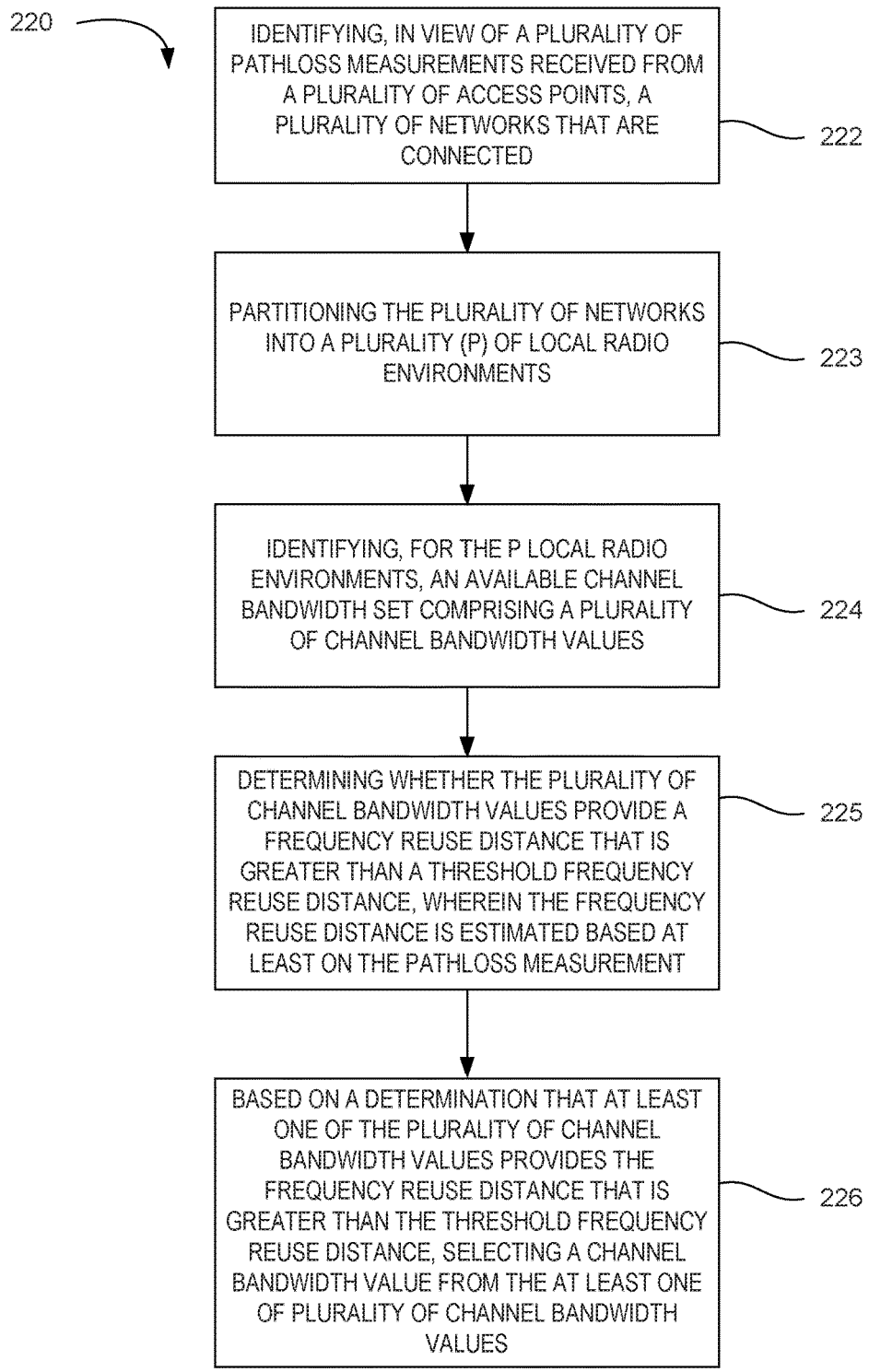
FIG. 2 illustrates an example flow diagram of a method consistent with the disclosure.

FIG. 2 illustrates an example flow diagram of a method 220 consistent with the disclosure. At block 222, the method 220 includes identifying, in view of a plurality of pathloss measurements received from a plurality of APs, a plurality of networks that are connected. At block 223, the method 220 includes partitioning the plurality of networks into a plurality (P) of local radio environments. At block 224, the method 220 includes identifying, for the P local radio environments, an available channel bandwidth set comprising a plurality of channel bandwidth values. At block 225, the method 220 includes determining whether the plurality of channel bandwidth values provide a frequency reuse distance that is greater than a threshold frequency reuse distance, wherein the frequency reuse distance may be estimated based at least on the pathloss measurement. At block 225, the method 220 includes, based on a determination that at least one of the plurality of channel bandwidth values provides the frequency reuse distance that is greater than the threshold frequency reuse distance, selecting a channel bandwidth value from the at least one of the plurality of channel bandwidth values.

The method 220 further comprising configuring a number of network devices with a channel bandwidth value. In some examples, the number of network devices include at least one of an AP, a client, and/or a controller. Selecting the channel bandwidth value may further comprise selecting the channel bandwidth value based on a change in a radio density in at least one of the plurality of networks.

In some examples, the change in a radio density includes an addition of an AP to at least one of the plurality of networks. The change in a radio density can also include a removal of an AP of at least one of the plurality of networks.

Determining whether the plurality of channel bandwidth values provide the frequency reuse distance that is greater than the threshold frequency reuse distance further comprises determining a first frequency reuse distance for an AP given that the AP is configured with a given channel bandwidth value from the plurality of channel bandwidth values. Determining whether the plurality of channel bandwidth values provide the frequency reuse distance that is greater than the threshold frequency reuse distance further comprises determining a second frequency reuse distance for a corresponding radio environment from the P local radio environments. Determining whether the plurality of channel bandwidth values provide the frequency reuse distance that is greater than the threshold frequency reuse distance also comprises, if the second frequency reuse distance is greater than the threshold frequency reuse distance, selecting the given channel bandwidth value as the channel bandwidth value.

The second frequency reuse distance may correspond to a medium value of a plurality of pathloss values corresponding to the P local radio environments. Determining the first frequency reuse distance for an AP further comprises calculating the frequency reuse distance in view of the given channel bandwidth value and a corresponding pathloss measurement. Calculating the frequency reuse distance further comprises, for the AP, ranking a plurality of neighboring APs based on corresponding pathloss values, calculating a number of non co-channel neighboring APs having corresponding frequency reuse distances which are less than a frequency reuse distance corresponding to the AP corresponding to a given channel bandwidth, and calculating the first frequency reuse distance based on the pathloss value corresponding to a ranked AP having an ranking equal to the number of non co-channel neighboring APs plus one.

Figure 3:
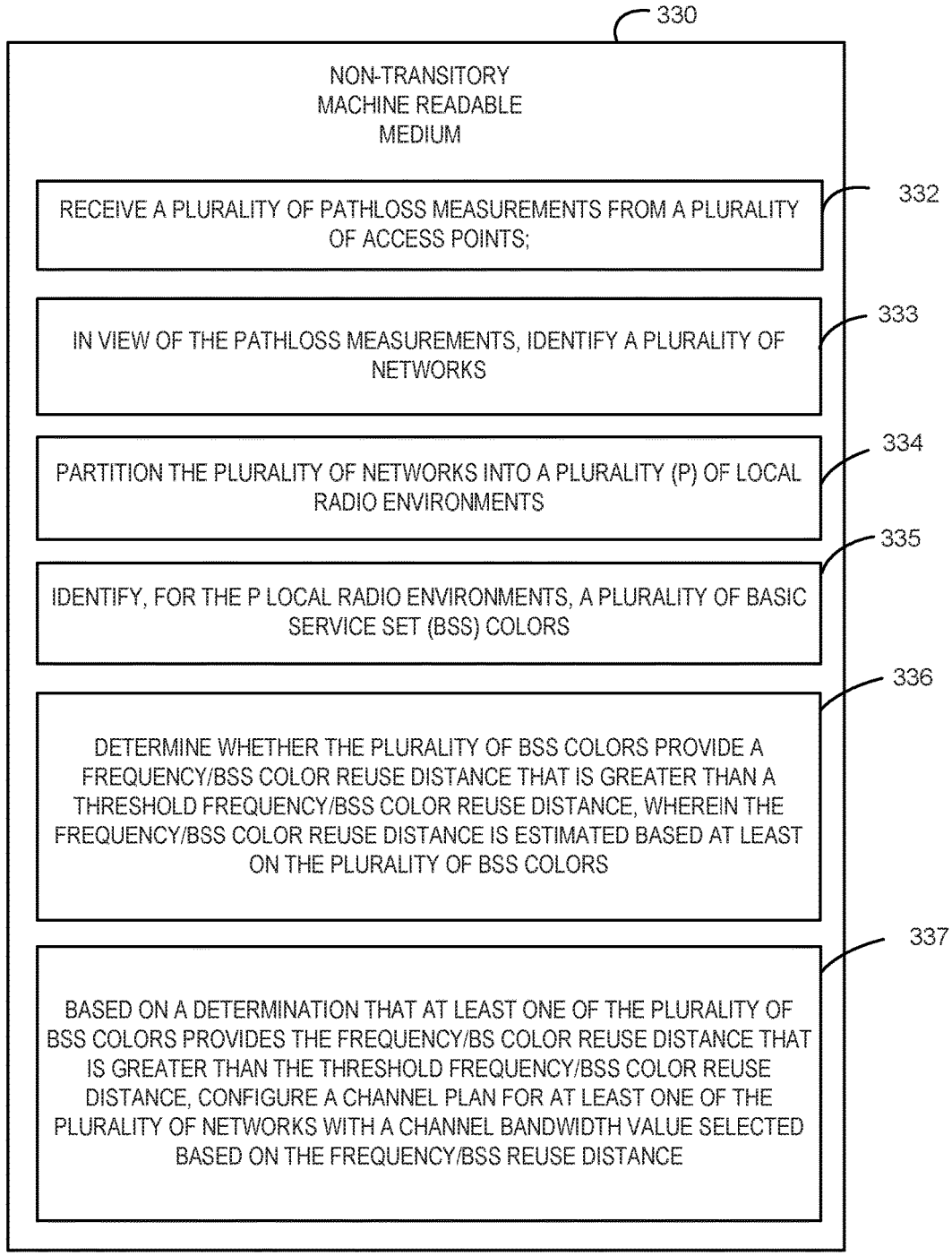
FIG. 3 illustrates an example non-transitory machine-readable medium consistent with the disclosure.

FIG. 3 illustrates an example non-transitory machine-readable medium 330 consistent with the disclosure. A processing resource may execute instructions stored on the non-transitory machine readable medium 330. The non-transitory machine readable medium 330 may be any type of volatile or non-volatile memory or storage, such as random access memory (RAM), flash memory, read-only memory (ROM), storage volumes, a hard disk, or a combination thereof.

The example medium 330 stores instructions 332 executable by a processing resource to receive a plurality of pathloss measurements from a plurality of APs. The example medium 330 also stores instructions 333 executable by the processing resource to, in view of the pathloss measurements, identify a plurality of networks. The example medium 330 also stores instructions 334 executable by the processing resource to partition the plurality of networks into a plurality (P) of local radio environments. The example medium 330 also stores instructions 335 executable by the processing resource to identify, for the P local radio environments, a plurality of BSS colors.

The example medium 330 also stores instructions 336 executable by the processing resource to determine whether the plurality of BSS colors provide a frequency/BSS color reuse distance that is greater than a threshold frequency/BSS color reuse distance, wherein the frequency/BSS color reuse distance is estimated based at least on the plurality of BSS colors. The example medium 330 also stores instructions 337 executable by the processing resource to, based on a determination that at least one of the plurality of BSS colors provides the frequency/BS color reuse distance that is greater than the threshold frequency/BSS color reuse distance, configure a channel plan for the at least one of the plurality of networks with a channel bandwidth value selected based on the frequency/BSS reuse distance.

The instructions 336 are further executable by the processing resource to configure an AP in the one of the plurality of networks with the channel bandwidth value. In some examples, the channel bandwidth value is selected based on a number of channels available for each of the at least one of the plurality of BSS colors.

FIG. 4 illustrates an example of a frequency reuse distance 446 consistent with the disclosure. FIG. 4 includes coverage area 440. The coverage area 440 includes APs 442-1, 442-2, 442-3, 442-4, 442-5, 442-6, and 442-7.

AP 442-1 has a coverage radius 444 (e.g., r). AP 442-1 also has frequency reuse distance 446 (e.g., D=3r).

FIG. 5 illustrates an example of a frequency reuse distance 546 consistent with the disclosure. FIG. 5 includes coverage area 540. The coverage area 540 includes APs 542-1, 542-2, 542-3, 542-4, 542-5, 542-6, and 542-7. AP 542-1 has a frequency reuse distance 546 (e.g., D=6r).

FIG. 6 illustrates a graph 660 of a frequency reuse distance consistent with the disclosure. The graph 660 includes an x-axis comprising a cluster size 662. The cluster size 662 describes a number of channels. The graph 660 also includes a y-axis comprising a frequency reuse distance 664. The graph 660 also comprises the line 666 which shows the relationship between the frequency reuse distance 664 and the cluster size 662.

FIG. 7 illustrates a graph 760 of a frequency reuse distance consistent with the disclosure. The graph 760 includes an x-axis comprising a frequency reuse distance 764. The graph 760 also includes a y-axis comprising an estimated number of neighbors 774 within the frequency reuse distance 764. The graph 760 also comprises the line 776 which shows the relationship between the frequency reuse distance 764 and the estimated number of neighbors 774.

FIG. 8 illustrates a graph 860 of a number of channels consistent with the disclosure. The graph 860 includes an x-axis comprising a cluster size 862. The graph 860 also includes a y-axis comprising an estimated number of neighbors 874 within the frequency reuse distance. The graph 860 also comprises the line 886 which shows the relationship between the cluster size 862 and the number of neighbors 874.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. As used herein, designators such as "N", etc., particularly with respect to reference numerals in the drawings, indicate that a number of the particular feature so designated can be included. A "plurality of" is intended to refer to more than one of such things.

What is claimed:

1. A network device comprising:
    a memory;
    a processor executing instructions stored in the memory to:
        identify, in view of a pathloss measurement received from an access point (AP), a plurality of networks that are connected;
        partition the plurality of networks into a plurality (P) of local radio environments;
        identify, for the P local radio environments, an available channel bandwidth set comprising a plurality of channel bandwidth values;
        determine whether the plurality of channel bandwidth values provide a frequency reuse distance that is greater than a threshold frequency reuse distance, wherein the frequency reuse distance is estimated based at least on the pathloss measurement; and
        based on a determination that at least one of the plurality of channel bandwidth values provides the frequency reuse distance that is greater than the threshold frequency reuse distance, configure a channel plan for the plurality of networks with a channel bandwidth value from the at least one of the plurality of channel bandwidth values.

2. The network device of claim 1, wherein the instructions are further configured to select the channel bandwidth value that is a widest channel bandwidth value from the at least one of the plurality of channel bandwidth values.

3. The network device of claim 1, wherein the instructions are further configured to, based on a determination that the plurality of channel bandwidth values provide a plurality of frequency reuse distances that are less than or equal to the threshold frequency reuse distance, configure the channel plan for the plurality of networks with the channel bandwidth from the plurality of channel bandwidth values with a greatest frequency reuse distance.

4. The network device of claim 1, wherein the instructions are further configured to configure the channel plan based on at least one of a change in a placement of the AP of at least one of the plurality of networks and a change of a radio environment in which at least one of the plurality of networks is operating.

5. The network device of claim 1, wherein the instructions are further configured to configure the channel plan based on a change to a configuration of the AP of at least one of the plurality of networks.

6. The network device of claim 1, wherein the channel plan comprises a frequency rage, a primary channel, and the channel bandwidth.

7. The network device of claim 1, wherein the instructions configured to identify the available channel bandwidth set are further configured to identify a union of a plurality of channel bandwidth sets corresponding to the P local radio environments.

8. A method for a network device for selecting a channel bandwidth, comprising:
    identifying, in view of a plurality of pathloss measurements received from a plurality of access points (APs), a plurality of networks that are connected;
    partitioning the plurality of networks into a plurality (P) of local radio environments;
    identifying, for the P local radio environments, an available channel bandwidth set comprising a plurality of channel bandwidth values;
    determining whether the plurality of channel bandwidth values provide a frequency reuse distance that is greater than a threshold frequency reuse distance, wherein the frequency reuse distance is estimated based at least on the pathloss measurement; and based on a determination that at least one of the plurality of channel bandwidth values provides the frequency reuse distance that is greater than the threshold frequency reuse distance, selecting a channel bandwidth value from the at least one of the plurality of channel bandwidth values.

9. The method of claim 8, further comprising configuring a number of network devices with the channel bandwidth value.

10. The method of claim 9, wherein the number of network devices includes at least one of an AP, a client, and a controller.

11. The method of claim 9, wherein selecting the channel bandwidth value further comprises selecting the channel bandwidth value based on a change in a radio density in at least one of the plurality of networks.

12. The method of claim 11, wherein the change in a radio density includes an addition of an AP to at least one of the plurality of networks.

13. The method of claim 11, wherein the change in a radio density includes a removal of an AP of at least one of the plurality of networks.

14. The method of claim 11, wherein determining whether the plurality of channel bandwidth values provide the frequency reuse distance that is greater than the threshold frequency reuse distance further comprises:
   determining a first frequency reuse distance for an AP given that the AP is configured with a given channel bandwidth value from the plurality of channel bandwidth values;
   determining a second frequency reuse distance for a corresponding radio environment from the P local radio environments;
   if the second frequency reuse distance is greater than the threshold frequency reuse distance, selecting the given channel bandwidth value as the channel bandwidth value.

15. The method of claim 14, wherein the second frequency reuse distance corresponds to a medium value of a plurality of pathloss values corresponding to the P local radio environments.

16. The method of claim 14, wherein determining the first frequency reuse distance for the AP further comprises calculating the first frequency reuse distance in view of the given channel bandwidth value and a corresponding pathloss measurement.

17. The method of claim 16, wherein calculating the frequency reuse distance further comprises, for the AP:
   ranking the plurality of neighboring APs based on corresponding pathloss values;
   calculating a number of non co-channel neighboring APs having corresponding frequency reuse distances which are less than a frequency reuse distance corresponding to the AP corresponding to a given channel bandwidth, wherein the number of non co-channel neighboring APs is dynamically updated based on radar events and high noise events; and
   calculating the first frequency reuse distance based on the pathloss value corresponding to a ranked AP having a ranking equal to the number of non co-channel neighboring APs plus one.

18. A non-transitory machine-readable medium storing instructions executable by a processing resource to:
   receive a plurality of pathloss measurements from a plurality of access points (APs);
   in view of the pathloss measurements, identify a plurality of networks;
   partition the plurality of networks into a plurality (P) of local radio environments;
   identify, for the P local radio environments, a plurality of basic service set (BSS) colors;
   determine whether the plurality of BSS colors provide a frequency/BSS color reuse distance that is greater than a threshold frequency/BSS color reuse distance, wherein the frequency/BSS color reuse distance is estimated based at least on the plurality of BSS colors; and
   based on a determination that at least one of the plurality of BSS colors provides the frequency/BSS color reuse distance that is greater than the threshold frequency/BSS color reuse distance, configure a channel plan for the at least one of the plurality of networks with a channel bandwidth value selected based on the frequency/BSS reuse distance.

19. The non-transitory machine-readable medium of claim 18, wherein the instructions are further executable by the processing resource to configure an AP in the one of the plurality of networks with the channel bandwidth value.

20. The non-transitory machine-readable medium of claim 18, wherein the channel bandwidth value is selected based on a number of channels available for each of the at least one of the plurality of BSS colors.

* * * * *